(12) United States Patent
Ohyama

(10) Patent No.: US 10,949,576 B2
(45) Date of Patent: Mar. 16, 2021

(54) INFORMATION PROCESSING SYSTEM, INFORMATION PROCESSING PROGRAM AND INFORMATION STORAGE DEVICE

(71) Applicant: NATIONAL INSTITUTE OF ADVANCED INDUSTRIAL SCIENCE AND TECHNOLOGY, Tokyo (JP)

(72) Inventor: Junji Ohyama, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 98 days.

(21) Appl. No.: 15/776,240

(22) PCT Filed: Nov. 18, 2016

(86) PCT No.: PCT/JP2016/084223
§ 371 (c)(1),
(2) Date: May 15, 2018

(87) PCT Pub. No.: WO2017/086428
PCT Pub. Date: May 26, 2017

(65) Prior Publication Data
US 2019/0130052 A1 May 2, 2019

(30) Foreign Application Priority Data
Nov. 19, 2015 (JP) .............................. JP2015-226847

(51) Int. Cl.
*G06F 13/10* (2006.01)
*G06F 30/00* (2020.01)
*G06F 111/02* (2020.01)

(52) U.S. Cl.
CPC .......... *G06F 30/00* (2020.01); *G06F 2111/02* (2020.01)

(58) Field of Classification Search
CPC ....... H04L 63/08; H04L 67/306; H04L 63/20; H04L 63/10; H04L 41/22; H04L 67/22;
(Continued)

(56) References Cited

U.S. PATENT DOCUMENTS

| 6,345,294 B1* | 2/2002 | O'Toole ............. G06K 13/0825 709/222 |
| 7,100,195 B1* | 8/2006 | Underwood ............ G06F 9/451 726/2 |

(Continued)

FOREIGN PATENT DOCUMENTS

| JP | H08-147243 A | 6/1996 |
| JP | H08147243 A | 6/1996 |

(Continued)

*Primary Examiner* — Rehana Perveen
*Assistant Examiner* — Cuong V Luu
(74) *Attorney, Agent, or Firm* — Muncy, Geissler, Olds & Lowe, P.C.

(57) ABSTRACT

A system manager generates information for a design that matches a property of a user without requiring a manufacturer of a subject of design configuration to analyze the property of the user related to a design on a user-by-user basis, with personal information on the user being kept secret from the manufacturer. A server reads user property information stored at a storage location indicated by second identification information transmitted from a terminal from an information storage device. The server generates, from the user property information and a design format from a subject device, design information representing information for the design that matches user property indicated by the user property information and transmits the design information to the subject device. The subject device converts the received design information into design configuration information and configures the subject device for the design that matches the property of the user.

7 Claims, 6 Drawing Sheets

(58) Field of Classification Search
CPC ... H04L 63/105; H04L 63/083; H04L 67/141; H04L 63/101; H04L 2012/285; H04L 51/046; H04L 2463/082; G06F 21/31; H04W 12/08; H04W 12/06
See application file for complete search history.

(56) References Cited

U.S. PATENT DOCUMENTS

| | | | |
|---|---|---|---|
| 7,181,438 B1* | 2/2007 | Szabo | G06F 21/6245 |
| 8,700,628 B1* | 4/2014 | Korn | G06F 16/951 |
| | | | 707/737 |
| 8,856,916 B1* | 10/2014 | Sobel | G06F 21/62 |
| | | | 726/17 |
| 9,203,707 B1* | 12/2015 | Hasija | H04L 41/50 |
| 2004/0117462 A1* | 6/2004 | Bodin | H04L 41/0843 |
| | | | 709/220 |
| 2004/0133416 A1* | 7/2004 | Fukuoka | H04L 67/02 |
| | | | 704/3 |
| 2006/0252530 A1* | 11/2006 | Oberberger | G07F 17/32 |
| | | | 463/29 |
| 2007/0192867 A1* | 8/2007 | Miliefsky | H04L 63/20 |
| | | | 726/25 |
| 2008/0276182 A1* | 11/2008 | Leow | H04M 1/72525 |
| | | | 715/740 |
| 2012/0109665 A1* | 5/2012 | Knutson | G06Q 10/08 |
| | | | 705/1.1 |
| 2014/0006231 A1* | 1/2014 | Salgueiro | G06Q 30/04 |
| | | | 705/30 |
| 2015/0026174 A1* | 1/2015 | Nuggehalli | G06Q 10/00 |
| | | | 707/736 |
| 2015/0026175 A1* | 1/2015 | Nuggehalli | G06Q 10/00 |
| | | | 707/736 |
| 2015/0161632 A1* | 6/2015 | Humay | G06Q 30/0203 |
| | | | 705/7.32 |
| 2015/0350443 A1* | 12/2015 | Kumar | H04M 3/5175 |
| | | | 379/265.13 |
| 2016/0055597 A1* | 2/2016 | Berson | G06Q 10/0639 |
| | | | 705/319 |
| 2017/0053329 A1* | 2/2017 | Bowers | G06Q 30/0609 |
| 2017/0070403 A1* | 3/2017 | Sugaya | H04L 41/0806 |
| 2019/0294018 A1* | 9/2019 | Shrivastava | G05B 15/02 |

FOREIGN PATENT DOCUMENTS

| | | |
|---|---|---|
| JP | H08255033 A | 10/1996 |
| JP | 2004-134834 A | 4/2004 |
| JP | 2004199217 A | 7/2004 |
| JP | 2006-236323 A | 9/2006 |
| JP | 2010-531479 A | 9/2010 |
| JP | 2015108934 A | 6/2015 |

* cited by examiner

INFORMATION PROCESSING SYSTEM, INFORMATION PROCESSING PROGRAM AND INFORMATION STORAGE DEVICE

TECHNICAL FIELD

The present invention relates to information processing systems, information processing programs, and information storage devices and, more particularly, to an information processing system, an information processing program, and an information storage device for configuring information (hereinafter, "design") related to a subject perceived by human being (e.g., industrial products, clothes, food, sound, images, etc.) and matching the property of a user, in a subject of design configuration used by the user.

BACKGROUND ART

There are many types of industrial products like electric appliances exemplified by a refrigerator, air conditioner, television set, etc. Information (design) like the displayed size, displayed position, displayed color, resolution, sound volume, etc. on the screen of liquid crystal user operation panels used in these electric appliances need to be configured independently for respective product types and for respective subjects of control according to the user preference, etc. The task of configuration is extremely complicated for the user. It is also difficult for the manufacturers of electric appliances at the fabrication and manufacturing stage to design and manufacture electric appliances capable of addressing diversified requirements for a design from numerous users.

Meanwhile, there is known a content distribution system adapted to distribute advertisement data selected by referring to property information on a user to a reception terminal of the user via a network along with content data (see, for example, patent document 1). The property information includes attribute information such as sex, age, and family profile and preference information related to the user's favorite pursuit and preference. It is conceivable to apply a content distribution system to design configuration in electric appliances and produce a design distribution system. In the design distribution system, the user requests a server managed by a system manager for a favorite design that the user wishes to configure via a network. In response, the manufacturer generates configuration information for a design that matches the property information on the requesting user and transmits the information from the server to the user via the network. This causes information for the requested design to be automatically configured in the electric appliance etc. in possession of the user.

[patent document 1] JP2004-199217

Problem to be Solved by the Invention

In the design distribution system described above, however, the user needs to provide his or her personal property information (i.e., personal information) with the result that the user may not be able to protect the personal information, or the personal information of the user may be leaked outside. It is also necessary for the manufacturer to create and configure the design adapted to individual users. Further, in the case of design configuration in liquid crystal user operation panels of electric appliances, for example, the above system only allows design configuration in the liquid crystal user operation panels of individual electric appliances. For configuration in a different type of electric appliance, an additional request for configuration of a design of the liquid crystal user operation panel will be necessary.

In this background, a representative purpose of the present invention is to provide an information processing system, information processing program, and information storage device capable of configuring information for a design that matches the property of the user in common to multiple types of subjects of design configuration such that the personal information of the user is kept secret from the manufacturer of the subject of design configuration.

Means to Solve the Problem

The information processing system according to a first aspect of invention is a system in which a first terminal used by a user and a server of a system manager are connected via a first network, and the server is connected to an information storage device of the system manager, the information processing system performing an information process to configure design information that matches a property of the user in a subject of design configuration, wherein the first terminal comprises: a first input means that inputs first identification information that is unique to the user and that is not made public to the server via the first network; a user selection information generation means that generates, based on user property evaluation information for evaluating the property of the user related to a design of the subject of design configuration, user selection information indicating the property of the user related to the design and transmits the user selection information to the server via the first network; and a second identification information processing means that receives second identification information transmitted from the server and indicating that user property information representing information for the design that matches the property of the user is stored, and stores or outputs the second identification information, wherein the server comprises: a user property evaluation information generation means that generates the user property evaluation information when the first identification information is received via the first network and transmits the user property evaluation information to the first terminal via the first network; a user property information generation means that evaluates the property of the user by referring to the user selection information received via the first network and generates the user property information that matches the property of the user related to the design, based on a result of evaluation; a storage means that stores the user property information in the information storage device; and a second identification information generation means that generates, when the user property information is generated, the second identification information identifying a storage location of the user property information in the information storage device and transmits the second identification information to the first terminal via the first network.

The information processing system according to a second aspect of the invention further comprises: a second input means that inputs the second identification information according to the first aspect of the invention in the server via a second network; a third input means that inputs subject designation information or a design format in the server via the second network or a third network, the subject designation information designating the subject of design configuration, and the design format being generated based on the subject designation information and indicating what kind of design makes up the subject of design configuration and which part is configurable within a prescribed latitude; a user property information reading means provided in the server and adapted to read the user property information from the information storage device by using, when the second identification information is received, the second identification information as a read control signal; a design information generation means provided in the server and adapted to generate the design information that matches the property of the user, based on the user property information read from the information storage device and the subject designation information or the design format input by the third input means; and a design configuration means that converts the design information generated in the server into design configuration information and configures the design of the subject of design configuration based on the design configuration information.

The information processing program according to a third aspect of the invention is adapted to a system in which a first terminal used by a user and a server of a system manager are connected via a first network, and the server is connected to an information storage device of the system manager, the information processing program causing a computer to implement an information process for configuring design information that matches a property of the user in a subject of design configuration, the information processing program comprising modules implemented by a first computer in the first terminal, including:

a user selection information generation module that generates, based on user property evaluation information for evaluating the property of the user related to a design of the subject of design configuration, user selection information indicating the property of the user related to the design and transmits the user selection information to the server via the first network; and a second identification information processing module that receives second identification information transmitted from the server and indicating a storage location in the information storage device where the user property information representing information for a design that matches the property of the user is stored, and stores or outputs the second identification information, and the information processing program further comprising modules implemented by a second computer in the server, including:

a user property evaluation information generation module that generates the user property evaluation information when the first identification information transmitted from the first terminal is received by the server via the first network and transmits the user property evaluation information to the first terminal via the first network, the first identification information being unique to the user of the subject of design configuration and not being made public to the server via the first network a user property information generation module that evaluates the property of the user by referring to the user selection information received via the first network and generates the user property information that matches the property of the user related to a design, based on a result of evaluation; a storage module that stores the user property information in the information storage device; and a second identification information generation module that generates, when the user property information is generated, the second identification information for identifying a storage location of the user property information in the information storage device and transmits the second identification information to the first terminal via the first network.

The information processing program according to a fourth aspect of the invention further comprises modules implemented by the second computer in the server according to the third aspect of the invention, including: a user property information reading module that reads the user property information from the information storage device by using the second identification information that is input as a read control signal; and a design information generation module that generates, when subject designation information designating the subject of design configuration or a design format generated based on the subject designation information and indicating what kind of design makes up the subject of design configuration and which part is configurable within a prescribed latitude is input, the design information that matches a property of the user, based on the user property information read from the information storage device and the subject designation information or the design format that is input.

The information storage device according to an aspect of the invention is a device of a system manager connected to a server of the system manager connected to a terminal used by a user according to the first aspect of the invention via a network, wherein the information storage device stores the user property information according to claim 1 that matches the property of the user related to a design and is generated based on a result of evaluation of the user selection information, the user selection information being received by the server from the terminal via the network and related to selection of a design by the user, and when the second identification information generated in the server, transmitted to the terminal, and indicating a storage location of the user property information is input from the terminal or another terminal via the network or another network, the user property information stored is read by using the second identification information that is input as a read control signal.

Advantage of the Invention

A representative benefit of the present invention is that information for the same design that matches the user property can be configured in multiple types of subjects of design configuration with personal information on the user being kept secret from the manufacturer of the subject of design configuration.

MODE FOR CARRYING OUT THE INVENTION

A description will be given of embodiments and exemplary embodiments of the present invention.

Figure 1:
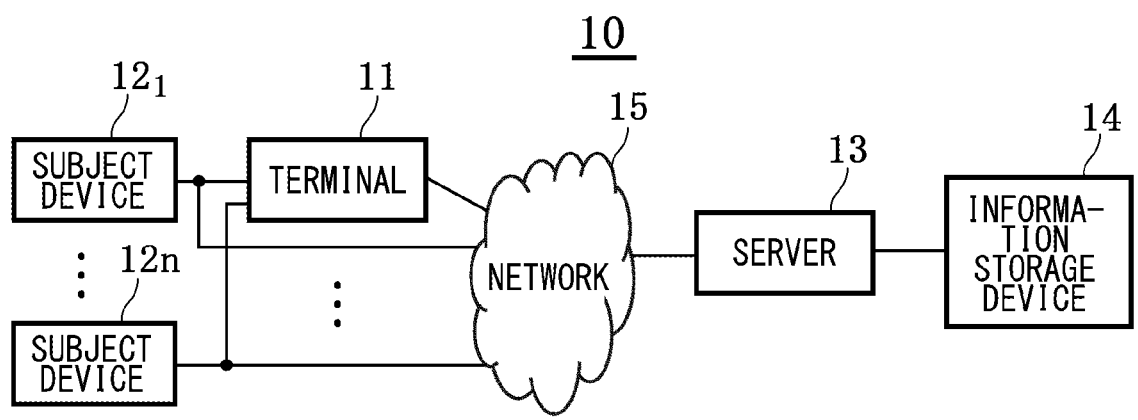
FIG. 1 shows a system configuration of an embodiment of an information processing system according to the present invention.

FIG. 1 shows a system configuration of an embodiment of an information processing system according to the present invention. An information processing system 10 according to the embodiment is provided with a terminal 11 used by user, n (n is an integer equal to or greater than 1) subject devices $12_1$~$12_n$ exemplifying subjects of design configuration, a server 13, and an information storage device 14, wherein the terminal 11, the subject devices $12_1$~$12_n$, and the server 13 are connected via a network 15 for bidirectional communication. The subject devices $12_1$~$12_n$ are n types of industrial products with different usages but provided with parts (parts subject to design configuration) configured for the same design. The information storage device 14 may be detachably connected to the server 13.

The terminal 11 at least has the function of communicating with the server 13 via the network 15 and causes the information storage device 14 connected to the server 13 to store user property information corresponding to the property of individual users received from the server 13. The terminal 11 may have a function of communicating trigger information to the subject devices $12_1$~$12_n$. In this specification, the user property information shall be understood to include the user's biological information such as eyesight and hearing ability as well as the user's preference for a design.

The server 13 performs communication described later with the terminal 11 via the network 15, acquires the user property information by evaluating the property of the user in various evaluation methods based on the information transmitted from the terminal 11, and transmits second identification information to the terminal 11 as well as storing the user property information in the information storage device 14. Subsequently, based on the second identification information from the terminal 11, the server 13 reads the user property information for the user using the requesting terminal 11 stored in the information storage device 14. The terminal 11 also has a function of transmitting, to the subject devices $12_1$~$12_n$, subject designation information that designates a subject device in which the design is configured.

The server 13 also has a function of receiving a design format from the subject device, among the subject devices $12_1$~$12_n$, where design information is configured. Further, the server 13 also has a function of referring to the user property information mentioned above and the design format and generating and transmitting design information for causing information for a design that matches the user property to be configured in the subject device where the design is configured. The server 13 and the information storage device 14 are managed by a system manager. The system manager may or may not be the same as the manufacturer of the subject devices $12_1$~$12_n$.

A description will now be given of the features of the information processing system 10.

Figure 2:
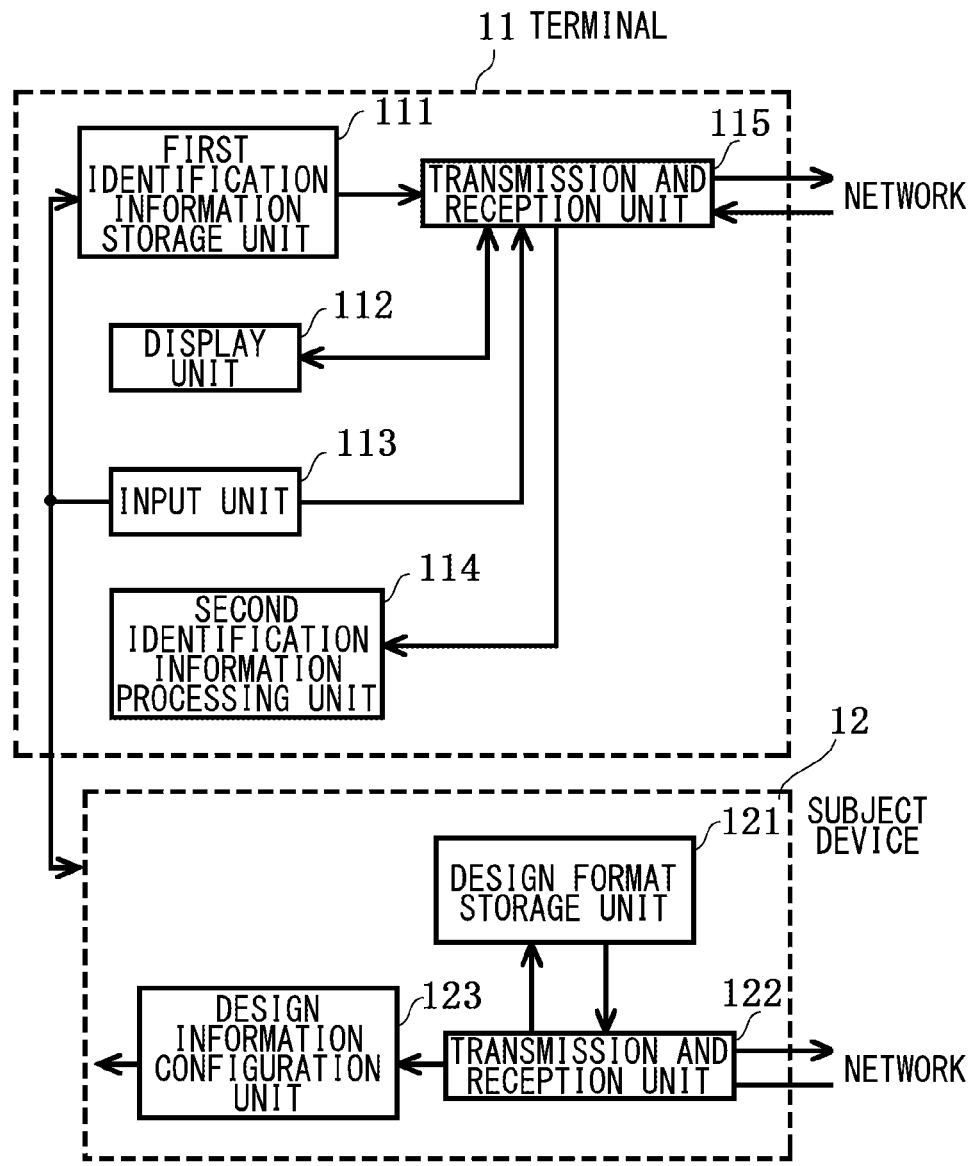
FIG. 2 is a block diagram of an embodiment of the terminal and the subject device of FIG. 1.

FIG. 2 is a block diagram of an embodiment of the terminal 11 and the subject device 12. As shown in the figure, the terminal 11 is provided with a first identification information storage unit 111, a display unit 112, an input unit 113, a second identification information processing unit 114, and a transmission and reception unit 115. The terminal 11 may have a function (not shown in FIG. 2) of transmitting subject designation information from the transmission and reception unit 115 according to a user operation in the input unit 113. The subject designation information designates a subject device for which the user seeks to configure the information for a design. For example, the subject designation information is a model number.

The first identification information storage unit 111 stores first identification information in advance of the operation. The first identification information is unique to the user using the terminal 11 and is not made public. The first identification may be account information or ID. The display unit 112 displays information for evaluation of the user property (user property evaluation information) described later received by the transmission and reception unit 115 from the server 13 via the network 15 and the like. The input unit 113 is used by the user to input information or to transmit, to the server 13, user selection information indicating, for example, the user's preference for a design based on the user property evaluation information displayed on the display unit 112. The second identification information processing unit 114 detects the second identification information received by the transmission and reception unit 115 from the server 13 via the network and stores the second identification information. The second identification information will be described later.

A description will now be given of a configuration of the subject devices $12_1$~$12_n$ of FIG. 1 with reference to FIG. 2.

The subject devices $12_1$~$12_n$ differ in the overall configuration depending on the device type but the feature relevant to the embodiment is common to the devices. FIG. 2 shows the common feature of a single subject device representing the subject devices $12_1$~$12_n$. Referring to FIG. 2, the subject device 12 is provided with a design format storage unit 121, a transmission and reception unit 122, and a design information configuration unit 123. The design format storage unit 121 stores a design format indicating what kind of design makes up the subject device 12, which part is configurable within a predefined latitude, etc. The design format includes, for example, a parameter name that is a name unique to the subject device itself. The transmission and reception unit 122 transmits and receives information to and from the server 13 via the network 15. The design information configuration unit 123 controls the computer in the subject device 12 in accordance with design information (described later) input from the transmission and reception unit 122 to configure the design where the design should be configured.

A description will now be given of a configuration of the server 13.

Figure 3:
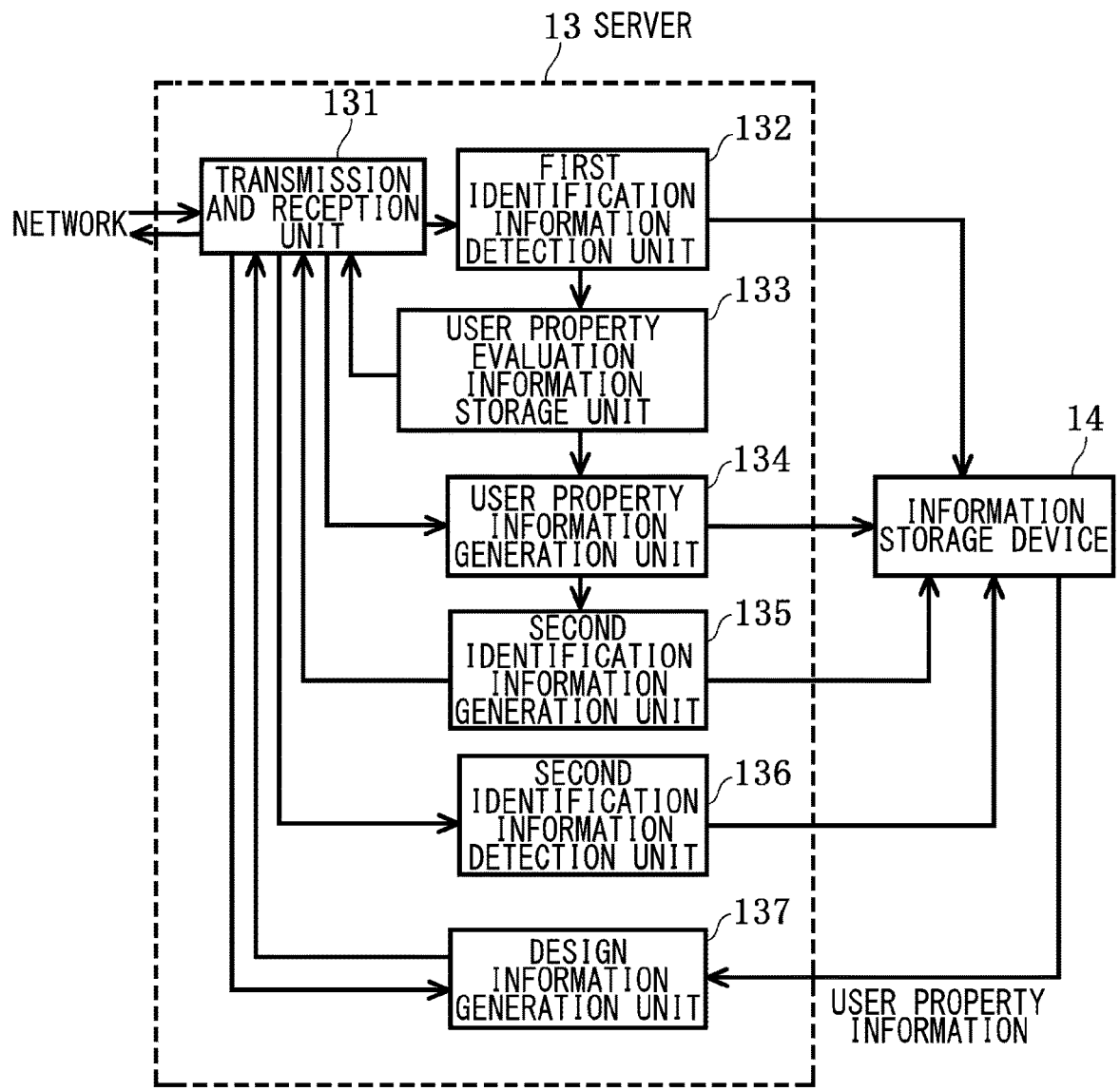
FIG. 3 is a block diagram of an embodiment of the server of FIG. 1.

FIG. 3 is a block diagram of an embodiment of the server 13. As shown in the figure, the server 13 includes a transmission and reception unit 131, a first identification information detection unit 132, a user property evaluation information storage unit 133, a user property information generation unit 134, a second identification information generation unit 135, a second identification information detection unit 136, and a design information generation unit 137. The first identification information detection unit 132, the user property information generation unit 134, the second identification information generation unit 135, the second identification information detection unit 136, and the design information generation unit 137 are comprised of hardware devices as in the case of the user property evaluation information storage unit 133 but may be implemented by software operations of a computer based on a program. The transmission and reception unit 131 performs bidirectional communication with the transmission and reception unit 115 of the terminal 11 or the transmission and reception unit 122 of the subject device 12 via the network 15.

The first identification information detection unit 132 detects whether a signal received by the transmission and reception unit 131 is the first identification information. The user property evaluation information storage unit 133 collects user property evaluation information in advance and outputs the user property evaluation information when a result indicating the detection of the first identification information is input from the first identification information detection unit 132. The user property evaluation information is presented to the user to evaluate (acquire), in the server 13, the property unique to the user relating to various design aspects of the subject devices $12_1$~$12_n$. The user property evaluation information is comprised of an image (character and color), sound, or a combination thereof.

In other words, the user property evaluation information may include specific examples of overall design (evaluation of several specific examples of overall display format), examples of the design of subelements (evaluation of color only, evaluation of character size), questions on the user's life, environment, and preferences (the questions are composed of images of characters, sound, or a combination thereof). It will be assumed here that the user property evaluation information includes: image-related information such as the character size, character color, display layout, and button size on the display unit of the subject devices $12_1$~$12_n$; sound information such as sound volume and tone; information defined by requesting an input of a numerical value (e.g., the size of the display screen, resolution, and eyesight), and several questions (questionnaire) related to the daily life. The image-related information or the sound information of the same type may be available in multiple variations that differ in the parameter (e.g., character images that differ in size stepwise and character images that differ in hue). The user property evaluation information is created by, for example, the manufacturer of the subject devices $12_1$~$12_n$.

The user property information generation unit 134 refers to a built-in database (hereinafter, referred to as "human property database" in this specification) in response to the user selection information received by the transmission and reception unit 131 and transmitted from the terminal 11 in return. The user property information generation unit 134 evaluates (estimates) the user property in any of a variety of publicly known evaluation methods to generate the user property information that matches the evaluated property of the user. The human property database stores information on the property of a variety of users about a variety of design elements in advance. For example, if the evaluation method is the one that offers an evaluation of the character size that is easy for the user to view based on the user selection information, the user property information that offers an evaluation of the property of the user (e.g., the colors of characters and the respective sizes thereof that are easy for the user to view) based on the information stored in the human property database is generated in advance.

The user property evaluation information may be specific examples of design and the user selection information may be a response. In this case, the user property information generation unit 134 may refer to the human property database based on the response and generate the user property information that offers an estimation of the design most suitable for the user. For example, when the user property evaluation information is the one that presents multiple images to the user successively (e.g., character sizes "10" and "50"), the user property information generation unit 134 refers to the human property database based on the answer, selection, evaluation score, response speed, etc. indicated in the user selection information as a response to the user property evaluation information so as to estimate the character size most suitable for the user to view. For example, if it is learned from the answer that the character size "10" is "too small to view" and the character size "50" is "somewhat too large", the user property information generation unit 134 estimates that the character size most suitable for the user having such a property to view is "34". The user property information generation unit 134 generates the character size estimated to be most suitable for the user to view as the user property information. Thus, the user property information generation unit 134 generates the user property information most suitable for the user, based on the range of brightness of the display screen, the range of character sizes, and the type of color that are felt as being most comfortable by the user, and the optimum range of sound volume, the range of present temperatures felt by the user of an air conditioner as being most comfortable, etc.

When the user property information is made available by the user property information generation unit 134, the second identification information generation unit 135 generate the second identification information and transmits the second identification information from the transmission and reception unit 131 to the terminal 11 via the network 15. The second identification information itself may or may not be linked to the first identification information that is not made public, but in either case the second identification information is made public. The second identification information should at least include the storage address (storage location) of the user property information in the information storage device 14. In essence, the second identification information is required to allow the user property information to be read from the information storage device 14, with the first identification information being kept secret. The second identification information detection unit 136 detects whether a signal received by the transmission and reception unit 131 is the second identification information. The second identification information is exemplified by a QR code (registered trademark). The design information generation unit 137 refers to the design format and the user property information and generates design information representing information for a design that matches the user of the subject device 12, in which the design is configured, and outputs the design information to the transmission and reception unit 131.

Figure 4:
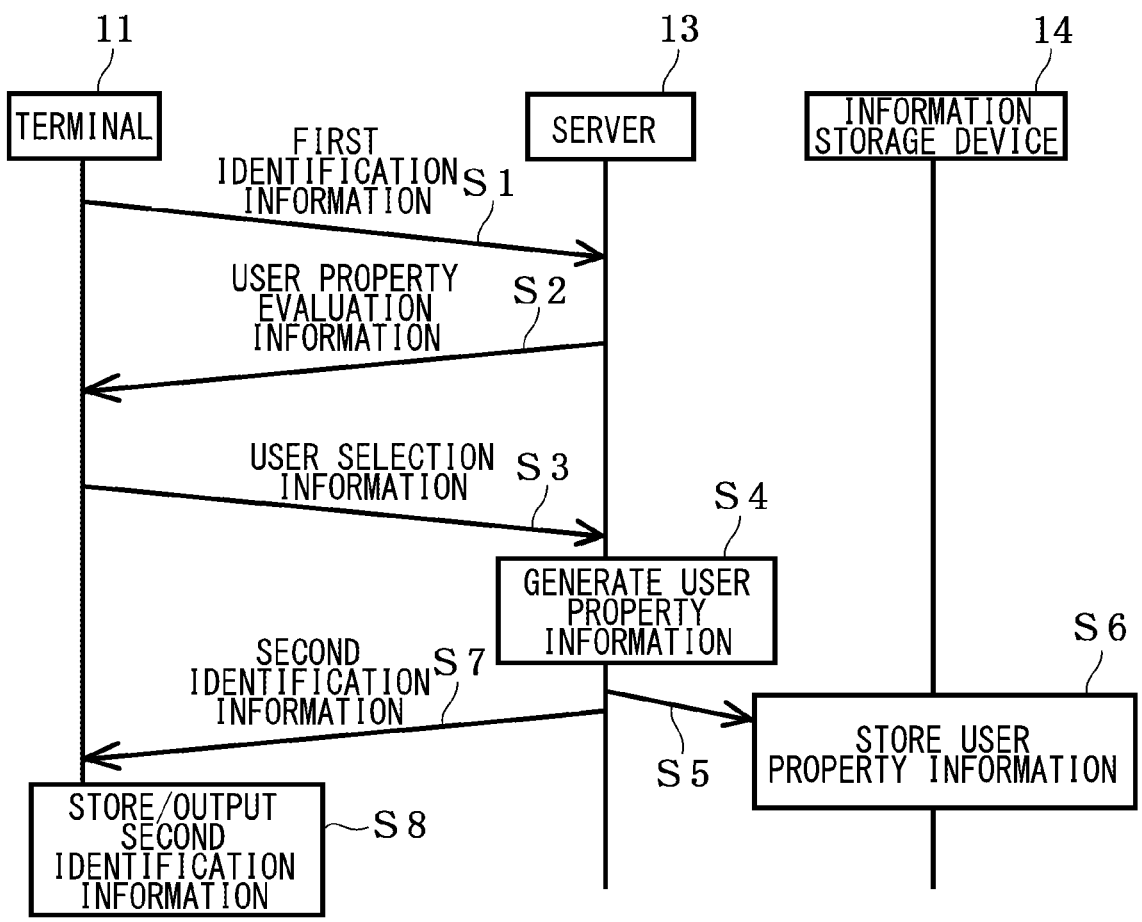
FIG. 4 is a sequence chart for illustration of the operation performed until the second identification information is stored or output in the terminal of FIG. 1.
Figure 5:
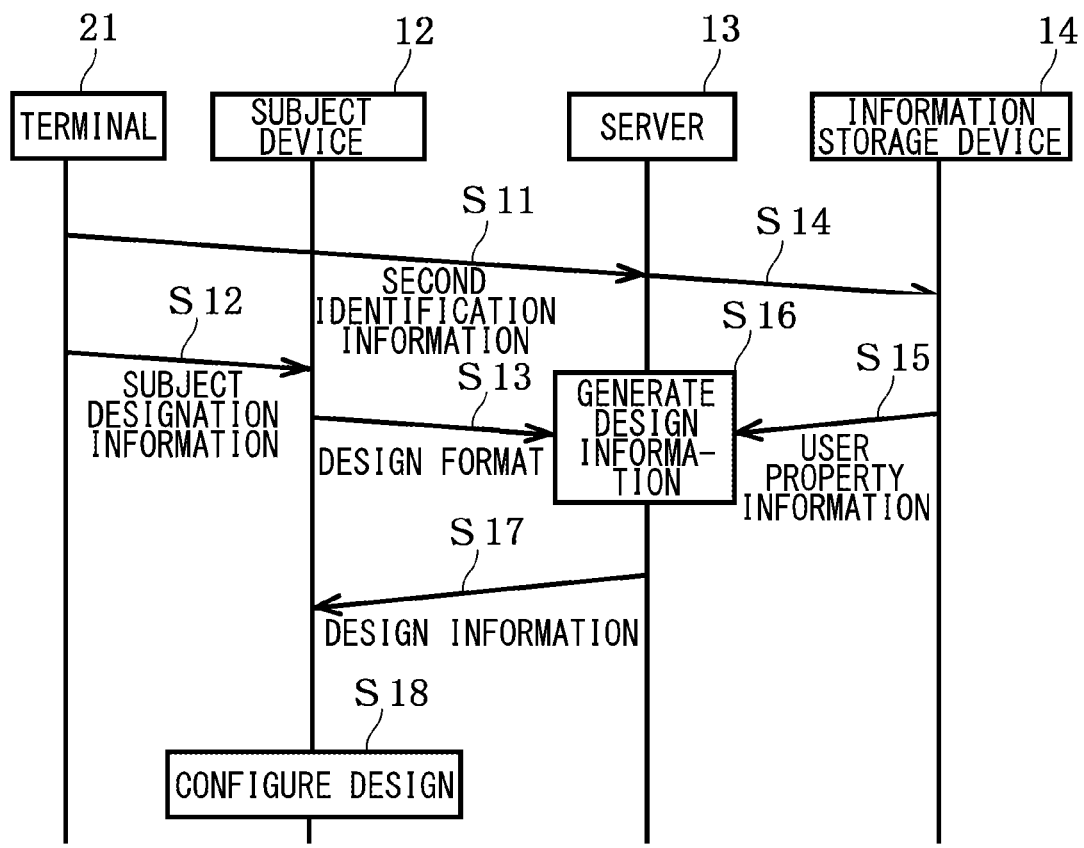
FIG. 5 is a sequence chart for illustration of an exemplary operation performed until the information for a design is configured in the subject device based on the second identification information.
Figure 6:
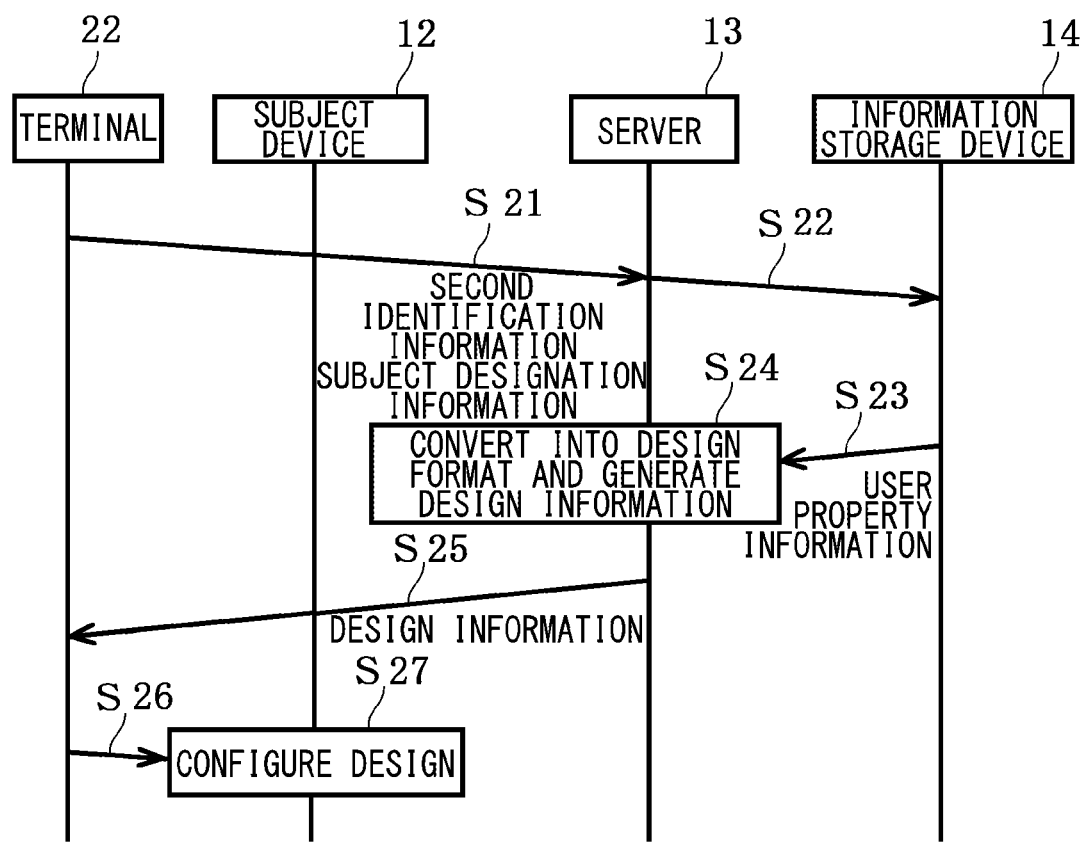
FIG. 6 is a sequence chart for illustration of another exemplary operation performed until the information for a design is configured in the subject device based on the second identification information.

A description will now be given of the operation of the information processing system 10 according to the embodiment, with reference to the block diagrams of FIGS. 1~3 and the sequence charts of FIGS. 4, and 5 or 6. FIG. 4 is a sequence chart for illustration of the operation performed until the second identification information is stored in the terminal 11, FIG. 5 is a sequence chart for illustration of an exemplary operation performed until the information for a design is configured in the subject devices $12_1$~$12_n$ based on the second identification information, and FIG. 6 is a sequence chart for illustration of another exemplary operation performed until the information for a design is configured in the subject devices $12_1$~$12_n$ based on the second identification information.

A description will first be given of the operation performed until the second identification information is stored in the terminal 11. In response to a user operation in the input unit 113 shown in FIG. 2, the terminal 11 reads the first identification information from the first identification information storage unit 111 and transmits the first identification information to the server 13 from the transmission and reception unit 115 via the network 15 (step S1 of FIG. 4). The first identification information is unique information pre-assigned to the user that is not made public. The first identification information allows the system manager to recognize a legitimate user of the information processing system 10 and identify the user property information stored in the information storage device 14.

When the first identification information detection unit 132 of the server 13 detects that the signal received by the transmission and reception unit 131 is the first identification information, the server 13 reads the user property evaluation information stored in advance in the user property evaluation information storage unit 133 and transmits, in response to the signal, the user property evaluation information to the source terminal 11 from the transmission and reception unit 131 via the network 15 (step S2 of FIG. 4). The terminal 11 displays the user property evaluation information received by the transmission and reception unit 115 on the display unit 112 (in the case of sound information, the sound is output from a speaker (not shown)). The display unit 112 may include a speaker. In this case, the user property evaluation information may be the sound output from the speaker or information comprised of a mixture of a still image, moving images, sound, etc.

As mentioned above, the user property evaluation information is used to evaluate, in the server 13, the user-specific property for various design aspects related to the subject devices $12_1$~$12_n$. The user property evaluation information is comprised of specific examples or images, sound, etc. for estimating the personal property of the user by referring to the human property database that stores property information on multiple users. The user property information is available in a variety of formats including a format that defines actual measurements of variables, a format that defines a viewing angle, etc.

When the user property evaluation information is received, the terminal 11 transmits the user selection information to the server 13 in response (step S3 of FIG. 4). In the case where the user property evaluation information displayed on the display unit 112 is comprised of multiple images, the user selection information represents information indicating a selection in the input unit 113 of one or more of the multiple images by the user wishing to configure the design. In the case where the user property evaluation information is comprised of biological information such as the eyesight of the user or a questionnaire that asks about the daily life, the user selection information represents answer information input in the input unit 113 and showing a numerical value of the eyesight or questionnaire results for multiple questions.

Upon receipt of the user selection information by the transmission and reception unit 131, the server 13 supplies the received user selection information to the user property information generation unit 134 to cause the user property information generation unit 134 to generate the user property information (step S4 of FIG. 4). In other words, the user property information generation unit 134 refers to the human property database based on the supplied user selection information and evaluates (estimates) the property such as the vision of the user, sound volume selected by the user, preference for display, room temperature felt as being comfortable, etc., according to a publicly known evaluation method that uses a test program, a psychological test, sampling measurement, or the like. Subsequently, based on the evaluation result, the user property information generation unit 134 generates user property information showing how the property of the user is defined in relation to the diversified human property and preferences. The user property information represents information that matches the property of the user related to a design.

Subsequently, the server 13 supplies the user property information generated by the user property information generation unit 134 and the first identification information received in step S1 to the information storage device 14 (step S5 of FIG. 4). In parallel with this, the user property information generation unit 134 notifies the second identification information generation unit 135 that the user property information is generated. The information storage device 14 stores the user property information and the first identification information supplied (step S6 of FIG. 4). In step S6, the information storage device 14 may store the user property information and the first identification information, mapping or without mapping them to each other. Further, the information storage device 14 may store the second identification information, mapping the second identification information to the user property information.

Meanwhile, the second identification information generation unit 135 generates the second identification information in response to the notification and transmits the second identification information from the transmission and reception unit 131 to the terminal 11 via the network 15 (step S7 of FIG. 4). As described above, the second identification information is required to allow the user property information stored in step S6 to be identified and read from the information storage device 14, with the first identification information being kept secret. By way of one example, the second identification information includes the storage address of the user property information in the information storage device 14 and is irrelevant to the first identification information. The second identification information received by the transmission and reception unit 115 of the terminal 11 is detected by the second identification information processing unit 114 and is stored or output (step S8 of FIG. 4). Storage or output of the second identification information allows the user of the terminal 11 to learn that the user property information that matches the property of the user related to a design has been stored in the server 13.

Meanwhile, a third party other than the user cannot know the content of the user property information stored in the information storage device 14 merely by referring to the second identification information. Further, even if the user property information is mapped to the first identification information and stored in the information storage device 14 accordingly, the first identification information is not read out and output and so is not known to the third party. The second identification information processing unit 114 may be configured to create and output a code like a QR code (registered trademark) as the second identification information. In this case, the second identification information can be transmitted to the server 13 to read the user property information from the information storage device 14 via the server 13 by holding, on the terminal side, the QR code over a reader connected to the network.

A description will now be given of an example of configuration of design information in a subject device with reference to the sequence chart of FIG. 5 and FIGS. 1~3. First, the second identification information obtained as described above is transmitted from a terminal 21 to the server 13 via the network 15 at a point of time defined by the user (step S11 of FIG. 5). Like the terminal 11, the terminal 21 is a terminal used by the user and may be identical to or different from the terminal 11. The terminal 21 may be connected to the server 13 by using another network instead of the network 15. The terminal 21 is exemplified by a terminal dedicated to transmission of the second identification information in a sales outlet or a home terminal. The second identification information may be transmitted when the user purchases the subject device 12 or immediately after the purchase.

In parallel with the transmission of the second identification information, the terminal 21 communicates subject designation information designating a subject device to one of the subject devices $12_1$~$12_n$ in which the user seeks to configure the design (step S12 of FIG. 5). In response to the communication, the subject device 12 transmits a design format to the server 13 via the network 15 (or another network) (step S13 of FIG. 5). The design format is information indicating what kind of design makes up a subject of design configuration and which part is configurable within a prescribed latitude. For example, the design format is a model number indicating the model of the subject device 12.

When the server 13 detects that the signal received by the transmission and reception unit 131 is the second identification information by using the second identification information detection unit 136, the server 13 supplies the second identification information to the information storage device 14 as a read control signal (step S14 of FIG. 5). This causes the information storage device 14 to read the stored user property information from the storage address indicated by the second identification information input as the read control signal (step S15 of FIG. 5). Even if the first identification information is mapped to the user property information and stored accordingly in the information storage device 14, the second identification information does not cause the first identification information to be read. This is because the storage address of the first identification information and the storage address of the second identification information are different.

The server 13 causes the design information generation unit 137 to generate, by referring to the user property information read from the information storage device 14 in step S15 and the design format received by the transmission and reception unit 131 in step S13, design information (e.g., a parameter value that matches the user property indicated by the user property information) that falls within a range, indicated by the design format, in which the design of the subject device 12 is configurable (step S16 of FIG. 5).

Subsequently, the server 13 transmits the design information generated by the design information generation unit 137 from the transmission and reception unit 131 to the subject device 12 via the network 15 (or another network) (step S17 of FIG. 5). In other words, the server 13 detects the second identification information by using the second identification information detection unit 136. However, the server 13 transmits the design information, which represents information for a design that matches the user property indicated by the user property information, to the subject device 12, by referring to the user proper information stored in the information storage device 14 and the design format from the subject device 12 and without identifying the user indicated by the first identification information.

When the subject device 12 of FIG. 2 receives the design information transmitted from the server 13 by using the transmission and reception unit 122, the subject device 12 supplies the design information to the design information configuration unit 123, which controls the computer hardware in the subject device 12 to configure the design in accordance with the design information (step S18 of FIG. 5). For example, for configuration of a character size displayed on the display unit of the subject device 12 in step S18 in accordance with the user's preference, the displayed character size desired by the user is configured by rewriting a portion of a display program, executed on the hardware (i.e., the display unit) by the computer for controlling the display, that describes the displayed character size to substitute for a parameter value defined in the design information.

As a result, information that matches the property of the user is configured in similar subjects of design configuration in the subject devices $12_1$~$12_n$ that differ in the product type. For example, even if the subject devices $12_1$~$12_n$ are different industrial products such as a refrigerator, air conditioner, and television set, the displayed size, displayed position, displayed color, resolution, sound volume, etc. on the screen of liquid crystal user operation panels provided in the subject devices $12_1$~$12_n$ and subject to configuration of design information can be configured commonly to match the user's preference or vision, provided that the liquid crystal user operation panels are commonly manufactured by the same manufacturer.

A description will now be given of another exemplary configuration of design information in a subject device with reference to the sequence chart of FIG. 6 and FIGS. 1~3. First, the second identification information and the subject designation information obtained as described above are transmitted from a terminal 22 to the server 13 via the network at a point of time defined by the user (step S21 of FIG. 6). Like the terminal 11, the terminal 22 is a terminal used by the user and may be identical to or different from the terminal 11. However, the terminal 22 is different from the terminal 21 and has a function of transmitting the second identification information and the subject designation information to the server 13 at the same time. The terminal 22 may have a function of transmitting the design format instead of the subject designation information. The terminal 22 may be connected for communication with the server 13 via a network other than the network 15.

When the server 13 detects that a signal received by the transmission and reception unit 131 is the second identification information by using the second identification information detection unit 136, the server 13 supplies the second identification information to the information storage device 14 as a read control signal (step S22 of FIG. 6). This allows the server 13 to read the user property information from the information storage device 14, based on the second identification information input as the read control signal (step S23 of FIG. 6).

The design information generation unit 137 in the server 13 has a function of converting the input subject designation information into the design format of the subject device indicated by the subject designation information. This allows the design information generation unit 137 to convert the subject designation information received and supplied by the transmission and reception unit 131 in step S21 into the design format and generate, by referring to the design format and the user property information read and supplied from the information storage device 14 in step S23, design information (e.g., a parameter value indicating information for a design that matches the user property indicated by the user property information) that falls within a range, indicated by the design format, in which the design of the subject device 12 is configurable (step S24 of FIG. 6).

Subsequently, the server 13 transmits the design information generated by the design information generation unit 137 from the transmission and reception unit 131 to the terminal 22 via the network 15 (or another network) (step S25 of FIG. 6). In essence, the server 13 transmits the design information that matches the user property indicated by the user property information to the terminal 22, the design information being generated from i) the user property information that matches the user property read from the information storage device 14 by using the second identification information detected by the second identification information detection unit 136 as a read control signal and ii) the design format of the subject devices 12.

When the terminal 22 receives the design information transmitted from the server 13 by using the transmission and reception unit, the terminal 22 transfers the design information to the subject device 12 (step S26 of FIG. 6). The subject device 12 controls the computer in the subject device 12 based on the transferred design information to cause the hardware to configure the design in accordance with the design information (step S27 of FIG. 6). For example, for configuration of a character size displayed on the display unit of the subject device 12 in step S27 in accordance with the user's preference, the displayed character size desired by the user is configured by rewriting a portion of a display program, executed on the hardware (i.e., the display unit) by a computer for controlling the display, that describes the displayed character size by using a parameter value defined in the design information.

Thus, the server 13 is capable of configuring information in the subject device 12 for a design that matches the user, by generating and transmitting, to the subject device 12, design information relating to the design that matches the user property indicated by the user property information, the design information being generated from the design format of the subject device subject to design configuration obtained by converting the received subject designation information and from the user property information obtained by reading it from the information storage device 14 by using the received second identification information as a read control signal. As a result, as in the case of FIG. 5, information that matches the property of the user is configured in similar subjects of design configuration in the subject devices $12_1$~$12_n$ that differ in the product type. Further, the first identification information is not read in the information storage device 14 by using the user property information as a key, and the first identification is not made public. Therefore, a third party will not be able to identify the user indicated by the first identification information.

The terminal 21 may be a terminal provided only with a transmitting function dedicated to transmission of the second identification information. The subject device 12 of FIG. 6 may be a device provided only with a reception function dedicated to reception of design information. Further, referring to FIGS. 5 and 6, a network that enables one-way only communication from a terminal dedicated to transmission of the second identification information to the server 13, or a network that enables one-way only communication for transmission of the design information from the server 13 to the subject devices 12 or the terminals 21, 22 may be provided.

Thus, according to the embodiment described with reference to FIGS. 1 through 6, it is possible to configure, in the subject devices $12_1$~$12_n$ before use, information for a design that matches the user property such that the personal information on the user is kept secret. Therefore, the user can use the subject devices $12_1$~$12_n$ configured for the user's favorite design from the outset. Further, the property such as the user's vision and preference for display is evaluated by referring to the information stored in the database in advance, based on the user property evaluation information selected by the user according his or her own property from among multiple user property evaluation information items with different variables (i.e., based on the user selection information). The user property information indicating the design that matches the user property is then generated based on the evaluation, and the design information (e.g., a parameter value) is generated from the user property information and the design format. Therefore, the manufacturer of the subject device at the fabrication and manufacturing stage can configure various information for a design in the subject devices such that a large number of users are addressed individually, without having to develop designs from user properties.

In further accordance with the embodiment, the user property information can be output by directly inputting the second identification information in the server of the system manager. Accordingly, the system manager does not need to identify a user so that the person information is protected. In other words, according to the embodiment, instead of having the system manager determine a design that should be configured by checking the personal information (the first identification information) of the user inputting the second identification information, the program of the server in which the second identification information is input automatically outputs the user property information in accordance with the second identification information. Therefore, the system manager does not need to identify a user so that the personal information is protected. In still further accordance with the embodiment, the human property database for various designs is used as a background, but then the user property information indicating the user property related to design is not directly made public but is stored and kept secret in the information storage device 14. Therefore, the user property information is kept secret from the user or the manufacturer of the subject devices.

The present invention is not limited to the embodiment described above. For example, the design information is converted by the design information configuration unit 123 in the subject device 12 into design configuration information for controlling the computer in the subject device, but the design information may be converted into design configuration information in the server 13 before being transmitted to the subject device 12. In this case, the subject devices $12_1$~$12_n$ can directly receive the design configuration information from the server 13 via the network to configure the design information accordingly. Further, the information storage device 14 may store the design information generated from the user property information and the design format.

Exemplary Embodiment 1

A description will now be given of exemplary embodiment 1 of the present invention. The exemplary embodiment is an example in which the present invention is applied to a liquid crystal operation panel of an electric appliance. This exemplary embodiment is directed to a case where the subject devices $12_1$~$12_n$ are multiple types of electric appliances that differ in the usage (e.g., air conditioner, television set, refrigerator, etc.) but are identical in that the liquid crystal user operation panel is the part subject to design configuration (subject of design configuration). The manufacturer prepares a liquid crystal user operation panel in which a part subject to design configuration that is desired to be modified according to the user is known and also prepares relevant user property evaluation information. In this exemplary embodiment, it is also assumed that one or more types of electric appliances is internally provided with a transmission and reception unit capable of bidirectional communication with the network 15.

In this exemplary embodiment, it is assumed that, according to the operation described with reference to FIG. 4, a QR code (registered trademark) is transmitted from the server 13 in communication with the terminal 11 as the second identification information and is received and output in the terminal 11. It is further assumed that the information storage device 14 stores the user property information related to the liquid crystal user operation panel such as the character size, character color, button size, etc. that are easy for the user of the electrical appliance (the subject devices $12_1 \sim 12_n$) to view.

Subsequently, by holding the QR code (registered trademark) over the code reader of the electric appliance or over the code reader of a terminal in a shop at the time of purchasing the electric appliance, the QR code (registered trademark) and the design format are transmitted to the server of the system manager via the network. In the case of purchasing an electric appliance in online shopping, the QR code (registered trademark) is held over the code reader of a terminal used by the user. Thereby, the QR code (registered trademark) is transferred from the online shop to the server of the system manager via the network, and the design format (or the subject designation information) is transmitted from the electric appliance purchased at the shop to the server. In either case, an operation similar to the operation described with reference to FIG. 5 or FIG. 6 is performed. The electric appliance provided with a liquid crystal user operation panel having a user operation screen design that matches the user property is made available before the purchased electric appliance is used for the first time.

Also, the user who purchased the electric appliance can make available at home a liquid crystal user operation panel having a user operation screen design of the electric appliance that matches the user property through an operation similar to the operation described with reference to FIG. 5, by holding the QR code (registered trademark) over the code reader of the electric appliance or the terminal. In any of the above-described cases, the design of the user operation screen of the liquid crystal user operation panel from the same manufacturer can be configured to match the user property regardless of whether the electric appliance is a refrigerator, air conditioner, television set, etc.

According to this exemplary embodiment, the design information for a user operation screen of a user operation panel having a design that matches the user property is generated based on the evaluation of the property of the user. Therefore, the manufacturer of the liquid crystal user operation panel at the fabrication and manufacturing stage does not need to develop a design from the property of the user and can configure, in the liquid crystal user operation panel, information for a design that matches the user individually.

In further accordance with this exemplary embodiment, the QR code (registered trademark) representing the second identification information that does not reveal personal information is transmitted to the server along with the design format (or the subject designation information), instead of the first identification information representing the personal information of the user. Accordingly, the design configuration information is automatically generated from the user property information stored at the storage address in the information storage device indicated by the QR code (registered trade mark) and from the design format. Thus, the system manager (at the server) does not need to identify a user to generate the design configuration information so that the personal information is protected.

Exemplary Embodiment 2

A description will now be given of the second exemplary embodiment. In this exemplary embodiment, the subject devices $12_1 \sim 12_n$ are smartphones exemplifying the mobile information device, and a web page is assumed to be a subject of design configuration. The design format is, for example, a Hyper Text Markup Language (HTML). User property evaluation information that describes the size of the browser screen of the smartphone is made available in such a manner that the size and color of characters and buttons presented on the display are known. In this exemplary embodiment, the server 13 is a web server.

In this exemplary embodiment, it is assumed that the web server has obtained an ID as the second identification information through communication between the terminal and the web server according to the operation described with reference to FIG. 4 and that the ID is stored in the terminal. It is also assumed that the user property information linked to the ID is stored in the information processing device connected to the web server. The user property information defines the character size, character color, button size, etc. that are easy for the user to view and is general-purpose information not limited for use in a specific type of smartphone or a screen design of a web page.

Subsequently, an operation similar to the operation described with reference to FIG. 5 is performed by inputting the ID, i.e., the second identification information, from the terminal when the user purchases the smartphone at a shop or purchases the smartphone at an online shop by using the terminal. Consequently, the user can secure the smartphone of a web page design that matches the user property even before the user uses the purchased smartphone for the first time. In the case of online shopping, however, the design information that matches the user property is transmitted from the web server to the smartphone scheduled to be purchased for configuration of the design. Further, the user who purchased the smartphone can secure the smartphone of a web page design that matches the user property by inputting the ID at home by using the web browser of the smartphone and communicating with the web server via the network.

According to this exemplary embodiment, the design information for a web page designed to match the property of the user is generated based on the evaluation of the property of the user. Therefore, the manufacturer of the smartphone at the fabrication and manufacturing stage does not need to develop the screen design of a web page from the property of the user and can configure, in a web page of the smartphone, information for a design that matches the user individually. In further accordance with this exemplary embodiment, the ID representing the second identification information is transmitted to the web server instead of the first identification information representing the personal information of the user. Accordingly, the user property information mapped to the ID and stored in the information storage device accordingly is read to generate the design configuration information automatically. Thus, the system manager (at the server) does not need to identify a user to generate the design configuration information so that the personal information is protected.

Exemplary Embodiment 3

In the embodiment and the exemplary embodiments 1, 2, the subjects of design configuration are the subject devices $12_1 \sim 12_n$ that are industrial products. This exemplary embodiment is unique in that the subjects of design configuration are semi-custom-made shoes and clothes that are not industrial products. In this exemplary embodiment, the user property evaluation information comprises a questionnaire requesting the user to indicate a dimension such as the length and width of the user's shoes (or clothes), a shape preferred by the user, and thickness, hardness, etc. of selected parts. The questionnaire may not only include shapes available for selection but may include items for selection such as multiple types of shoes (clothes) that differ in the decoration, etc. and choices on how the shoes or clothes should fit. The user needs to measure the size (length, width, instep height) of his or her foot by using an appropriate measuring device in advance.

In this exemplary embodiment, the subjects of design configuration are not industrial products so that the subjects of design configuration are not provided a function of communicating with a network. Therefore, the terminal controlled by the user (the terminal may be identical to or different from the terminal for transmitting the first identification information and/or the second identification information) has a function of transmitting subject designation information. The manufacturer configures information for a design that matches the user in the subject of design configuration based on the design information received by, for example, a terminal at the manufacturer from a server.

In this exemplary embodiment, the user uses the terminal to transmit the first identification information that is unique to the user and not made public to the server. The user then receives a questionnaire representing user property evaluation information and transmits an answer to the questionnaire to the server as user selection information. This server then refers to a database based on the received user selection information by using the user property information generation unit to estimate and evaluates the personal property including the shape and hardness of the user's foot (or body), and the user's feeling. The server generates the user property information that defines the size of shoes (or clothes) or how the shoes or clothes should fit based on the evaluation. Subsequently, the server stores the user property information in the information storage device and transmits an ID as the second identification information to the terminal. This allows the user using the terminal to acquire the ID via the terminal. The first identification information may be information on the fingerprint of the user's finger or toe obtained by a publicly known fingerprint recognition device and transmitted to the server.

When the user having the ID subsequently selects and purchases multiple types of shoes of favorite shapes from the same manufacturer at, for example, an online shop, the user transmits the ID to the server either directly from the terminal that the user uses and via the network or via the terminal of the online shop and the network. The user also transmits, from the terminal to the server, predetermined subject designation information such as a model number that allows the server to identify the shoes to purchase. This allows the server to read, from the information storage device, the user property information on the shoes that matches the property of the user transmitting the ID. The server transmits the user property information and the subject designation information to the reception terminal of the manufacturer. The manufacturer generates design information reflected in the actual manufacturing of the shoes from the user property information received by the reception terminal and from the design format derived from converting the subject designation information. The manufacturer concurrently manufactures the multiples types of shoes preferred by the user based on the design information. This will allow the multiple types of shows of foot comfort suited to the user and of favorite shape, color, etc. to reach the user from the manufacturer. In this case, the multiple types of shoes that match the user property are shoes with different usages. Similar steps are taken in the case of clothes.

In the case of this exemplary embodiment, as in the cases previously described, the design information that matches the property of the user is generated based on the evaluation of the property of the user. Therefore, the manufacturer of shoes or clothes at the fabrication and manufacturing stage does not need to develop the design from user property and can manufacture shoes or clothes that matches the user individually. In further accordance with this exemplary embodiment, the design information that matches the user having the ID is automatically generated by transmitting the ID representing the second identification information and the subject designation information to the server. Thus, the system manager (at the server) does not need to identify a user to generate the design information so that the personal information is protected.

The present invention is not limited to the embodiment and the exemplary embodiments described above. For example, the present invention covers a program for implementing the function of the second identification information processing unit 114 shown in FIG. 2 by a first computer in the terminal 11, or a program for implementing the functions of the first identification information detection unit 132, the user property information generation unit 134, the second identification information generation unit 135, the second identification information detection unit 136, and the design information generation unit 137 shown in FIG. 3 by a second computer in the server 13. The programs for the first and second computers may be imported into the computers by being read from a recording medium or distributed via a network. Alternatively, the programs may be stored in the first and second computers in the form of firmware.

FIG. 2 shows that the first identification information storage unit 111 is provided in the terminal 11. Alternatively, the first identification information storage unit 111 may not be provided and the user may use the input unit 113 to directly input the first identification information to transmit the first identification information to the server 13 via the transmission and reception unit 115 and the network 15.

DESCRIPTION OF THE REFERENCE NUMERALS

10 information processing system
11, 21, 22 terminal
12₁~12ₙ subject devices
13 server
14 information storage device
15 network
111 first identification storage unit
112 display unit
113 input unit
114 second identification processing unit
115, 122, 131 transmission and reception unit
121 design format storage unit
123 design information configuration unit
132 first identification information detection unit
133 user property evaluation information storage unit
134 user property information generation unit
135 second identification information generation unit
136 second identification information detection unit
137 design information generation unit

The invention claimed is:

1. An information processing system in which a first terminal used by a user and a server of a system manager are connected via a first network, and the server is connected to an information storage device of the system manager, the information processing system performing an information process to configure design information that matches a property of the user in a subject of design configuration, wherein the first terminal comprises:

a first inputter of a computer system that inputs first identification information that is unique to the user and that is not made public to the server via the first network;

a user selection information generator of the computer system that generates, based on user property evaluation information for evaluating the property of the user related to a design of the subject of design configuration, user selection information indicating the property of the user related to the design and transmits the user selection information to the server via the first network; and a second identification information processor of the computer system that receives second identification information transmitted from the server and indicating that user property information representing information for the design that matches the property of the user is stored, and stores or outputs the second identification information, wherein the server comprises:

a user property evaluation information generator of the computer system that generates the user property evaluation information when the first identification information is received via the first network and transmits the user property evaluation information to the first terminal via the first network;

a user property information generator of the computer system that evaluates the property of the user by referring to the user selection information received via the first network and generates the user property information that matches the property of the user related to the design, based on a result of evaluation;

a storing unit of the computer system that stores the user property information in the information storage device;

a second identification information generator of the computer system that generates, when the user property information is generated, the second identification information identifying a storage location of the user property information in the information storage device and transmits the second identification information to the first terminal via the first network;

a second inputter of the computer system that inputs the second identification information in the server via a second network;

a third inputter of the computer system that inputs subject designation information or a design format in the server via the second network or a third network, the subject designation information designating the subject of design configuration, and the design format being generated based on the subject designation information and indicating what kind of design makes up the subject of design configuration and which part is configurable within a prescribed latitude;

a user property information reader of the computer system provided in the server and adapted to read the user property information from the information storage device by using, when the second identification information is received, the second identification information as a read control signal;

a design information generator of the computer system provided in the server and adapted to generate the design information that matches the property of the user, based on the user property information read from the information storage device and the subject designation information or the design format input by the third inputter; and a design configurator of the computer system that converts the design information generated in the server into design configuration information and configures the design of the subject of design configuration based on the design configuration information.

2. The information processing system according to claim 1, wherein the design configurator is provided in each of a plurality of types of subjects of design configuration with different usages but provided with parts configured for the same design so that the same design configuration is made based on the same design information.

3. The information processing system according to claim 1, wherein the design configurator is provided in the subject of design configuration that is an industrial product to convert the design information received from the server via the second network or the third network into the design configuration information and configure the design of the subject of design configuration based on the design configuration information resulting from conversion.

4. The information processing system according to claim 1, wherein the server further comprises a convertor of the computer system that converts the design information into design configuration information and transmits the design configuration information resulting from conversion to the second or third network, and the design configurator is provided in the subject of design configuration that is an industrial product to configure the design of the subject of design configuration based on the design configuration information received from the server via the second or third network.

5. The information processing system according to claim 1, wherein the second network is the same as the first network connected to the first terminal, or a network different from the first network and connected to a second terminal at least provided with a transmission function, and the third network is different from the first and second networks.

6. The information processing system according to claim 1, wherein the subject of design configuration is an industrial product having a function of transmitting, based on a supplied subject designation information, a parameter name of the subject of design configuration as the design format to the server via the second or third network.

7. The information processing system according to claim 1, wherein the design information generator generates a parameter value as the design information that matches the property of the user either i) based, in the case where the design format is input by the third inputter, on the design format and the user property information read from the information storage device, or ii) based, in the case where the subject designation information is input by the third inputter, on the design format derived from converting the subject designation information and the user property information read from the information processing device.

\* \* \* \* \*